(12) United States Patent
Zaydman et al.

(10) Patent No.: US 11,188,308 B2
(45) Date of Patent: Nov. 30, 2021

(54) INTERACTIVE CODE EDITING

(71) Applicant: Apple Inc., Cupertino, CA (US)

(72) Inventors: Oleg Zaydman, San Jose, CA (US); Ashok Srinivasan, Ottawa (CA)

(73) Assignee: Apple Inc., Cupertino, CA (US)

( * ) Notice: Subject to any disclaimer, the term of this patent is extended or adjusted under 35 U.S.C. 154(b) by 1202 days.

(21) Appl. No.: 14/339,422

(22) Filed: Jul. 23, 2014

(65) Prior Publication Data

US 2016/0026439 A1    Jan. 28, 2016

(51) Int. Cl.
*G06F 8/33* (2018.01)
*G06F 40/166* (2020.01)
*G06F 8/34* (2018.01)

(52) U.S. Cl.
CPC .............. *G06F 8/33* (2013.01); *G06F 8/34* (2013.01); *G06F 40/166* (2020.01)

(58) Field of Classification Search
CPC .............. G06F 8/33; G06F 8/34; G06F 9/44
See application file for complete search history.

(56) References Cited

U.S. PATENT DOCUMENTS

| | | | | |
|---|---|---|---|---|
| 5,128,672 A | * | 7/1992 | Kaehler | G06F 3/0237 341/23 |
| 5,761,689 A | * | 6/1998 | Rayson | G06F 17/273 715/210 |
| 6,268,852 B1 | * | 7/2001 | Lindhorst | G06F 8/34 715/234 |
| 6,305,008 B1 | * | 10/2001 | Vaidyanathan | G06F 8/33 707/999.104 |
| 6,377,965 B1 | * | 4/2002 | Hachamovitch | G06F 17/276 715/203 |
| 6,564,213 B1 | * | 5/2003 | Ortega | G06F 17/3064 |
| 7,716,636 B2 | * | 5/2010 | Goncharenko | G06F 8/70 717/113 |
| 8,321,847 B1 | * | 11/2012 | Garvin | G06F 8/34 717/143 |
| 8,473,507 B2 | | 6/2013 | Loofbourrow et al. | |
| 8,667,456 B1 | * | 3/2014 | Czymontek | G06F 8/315 707/696 |
| 9,141,348 B1 | * | 9/2015 | Bienkowski | G06F 9/453 |
| 9,569,179 B1 | * | 2/2017 | Kachmar | G06F 8/10 |
| 2002/0016953 A1 | * | 2/2002 | Sollich | G06F 8/33 717/100 |

(Continued)

OTHER PUBLICATIONS

"Code Assistance in the NetBeans IDE Java Editor: A Reference Guide", NetBeans, accessed from <https://netbeans.org/kb/docs/java/editor-codereference.html>, accessed using Internet Archive on Oct. 18, 2012, pp. 1-11 (Year: 2012).*

(Continued)

*Primary Examiner* — Nicholas Klicos
(74) *Attorney, Agent, or Firm* — Invoke (57) ABSTRACT

Techniques for interactive code editing are described. A system can provide for display a code editing environment that resembles a text editor. Upon detecting various user inputs, the system can display, in place of text, widgets in the code editing environment. The widgets can have the appearance of text, and have functions to interact with the user to provide various conveniences including, for example, line management, step completion, calculation completion, parameter management, and code folding.

24 Claims, 9 Drawing Sheets

(56) References Cited

U.S. PATENT DOCUMENTS

| | | | | |
|---|---|---|---|---|
| 2005/0114832 A1* | 5/2005 | Manu | G06F 8/34 | 717/106 |
| 2005/0223363 A1* | 10/2005 | Black-Ziegelbein | G06F 11/3624 | 717/127 |
| 2006/0026559 A1* | 2/2006 | Gunturi | G06F 8/20 | 717/110 |
| 2007/0038951 A1 | 2/2007 | Danker et al. | | |
| 2007/0288867 A1* | 12/2007 | Gunturi | G06F 8/38 | 715/825 |
| 2008/0022259 A1* | 1/2008 | MacKlem | G06F 8/34 | 717/113 |
| 2008/0177717 A1* | 7/2008 | Kumar | G06F 16/3322 | |
| 2008/0307385 A1* | 12/2008 | Dreiling | G06F 8/34 | 717/108 |
| 2008/0320438 A1* | 12/2008 | Funto | G06F 8/33 | 717/106 |
| 2008/0320444 A1* | 12/2008 | Meijer | G06F 8/33 | 717/110 |
| 2009/0007122 A1* | 1/2009 | Peyton | G06F 8/34 | 718/102 |
| 2009/0013248 A1* | 1/2009 | Hutchison | G06F 8/33 | 715/256 |
| 2009/0077534 A1* | 3/2009 | Peterson | G06F 16/832 | 717/111 |
| 2010/0100868 A1* | 4/2010 | Shukla | G06F 8/34 | 717/109 |
| 2011/0167404 A1* | 7/2011 | Liu | G06F 8/33 | 717/106 |
| 2011/0202688 A1* | 8/2011 | Shah | G06F 8/34 | 710/5 |
| 2011/0271258 A1* | 11/2011 | Park | G06F 8/33 | 717/127 |
| 2012/0005604 A1* | 1/2012 | Wirch | G06F 8/34 | 715/765 |
| 2012/0131547 A1* | 5/2012 | Muir | G06F 8/20 | 717/109 |
| 2012/0174061 A1* | 7/2012 | McCollum | G06F 8/33 | 717/106 |
| 2012/0290940 A1* | 11/2012 | Quine | G06F 8/34 | 715/744 |
| 2012/0311480 A1* | 12/2012 | Cohen | G06F 3/0237 | 715/780 |
| 2013/0174120 A1* | 7/2013 | Kalaidjian | G06F 8/34 | 717/113 |
| 2013/0268912 A1* | 10/2013 | Kizhakkevalappil | G06F 8/34 | 717/109 |
| 2013/0290928 A1* | 10/2013 | Johnson | G06F 8/40 | 717/109 |
| 2013/0346942 A1* | 12/2013 | Bragdon | G06F 8/33 | 717/113 |
| 2014/0173563 A1* | 6/2014 | Dias | G06F 8/36 | 717/123 |
| 2014/0282375 A1* | 9/2014 | Gulwani | G06F 8/36 | 717/107 |
| 2014/0317072 A1* | 10/2014 | Gordner | G06F 17/3097 | 707/706 |
| 2014/0351251 A1* | 11/2014 | Amano | G06F 17/3066 | 707/736 |
| 2015/0301806 A1* | 10/2015 | Leon | G06F 8/33 | 717/113 |
| 2016/0188301 A1* | 6/2016 | Zang | G06F 8/33 | 717/113 |
| 2018/0285084 A1* | 10/2018 | Mimlitch, III | G06F 8/34 | |

OTHER PUBLICATIONS

"PHP Code Completion", NuSphere Corp., retrieved using Wayback Machine on Feb. 4, 2012, retrieved from <https://web.archive.org/web/20120204181832/http://www.nusphere.com/products/php_code_completion.htm>, pp. 1-2 (Year: 2012).*

* cited by examiner

INTERACTIVE CODE EDITING

TECHNICAL FIELD

This disclosure relates generally to software development tools.

BACKGROUND

An integrated development environment (IDE) can include a source code editor, a build automation tool, and a debugger. The source code editor can include a text editor for receiving user input, e.g., typed or pasted content. The content can be unstructured text that follows a programming syntax, grammar, and style. The text can be source code of a script language, e.g., FileMaker™ Script, or source code of a markup language, e.g. hypertext markup language (HTML). The syntax can include, for example, a list of keywords permissible in a language; the grammar can include a list of parameter types of a function or procedure; and the style can include conventions of indentation, spacing, and comments.

SUMMARY

Techniques for interactive code editing are described. A system can provide for display a code editing environment that resembles a text editor. Upon detecting various user inputs, the system can display, in place of text, widgets in the code editing environment. The widgets can have the appearance of text, and have functions to interact with the user to provide various conveniences including, for example, line management, step completion, calculation completion, parameter management, and code folding.

The features described in this specification can be implemented to achieve one or more advantages. Compared to conventional source code editor, the techniques described in this specification provide additional user help and convenience. Interactive editing can combine advantages of typing, e.g., speed and readability, with advantages of interactive construction via dialogs, e.g., being novice friendly. User interface for interactive editing can be done on a parameter level using widgets. This optimizes data entry via keyboard, and enables more granular undo and redo. Accordingly, interactive editing can offer step completion that is more versatile than conventional keyword completion; interactive editing can offer parameter management that blends keyboard input and mouse input or touch input more smoothly; and interactive editing can offer code folding that keeps comments from being hidden, allowing a programmer to read and understand the code more quickly. The resulting code can be easy to read, because the code may be visually indistinguishable from code a user typed directly.

The details of one or more implementations of the subject matter are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Exemplary User Interfaces

Figure 1:
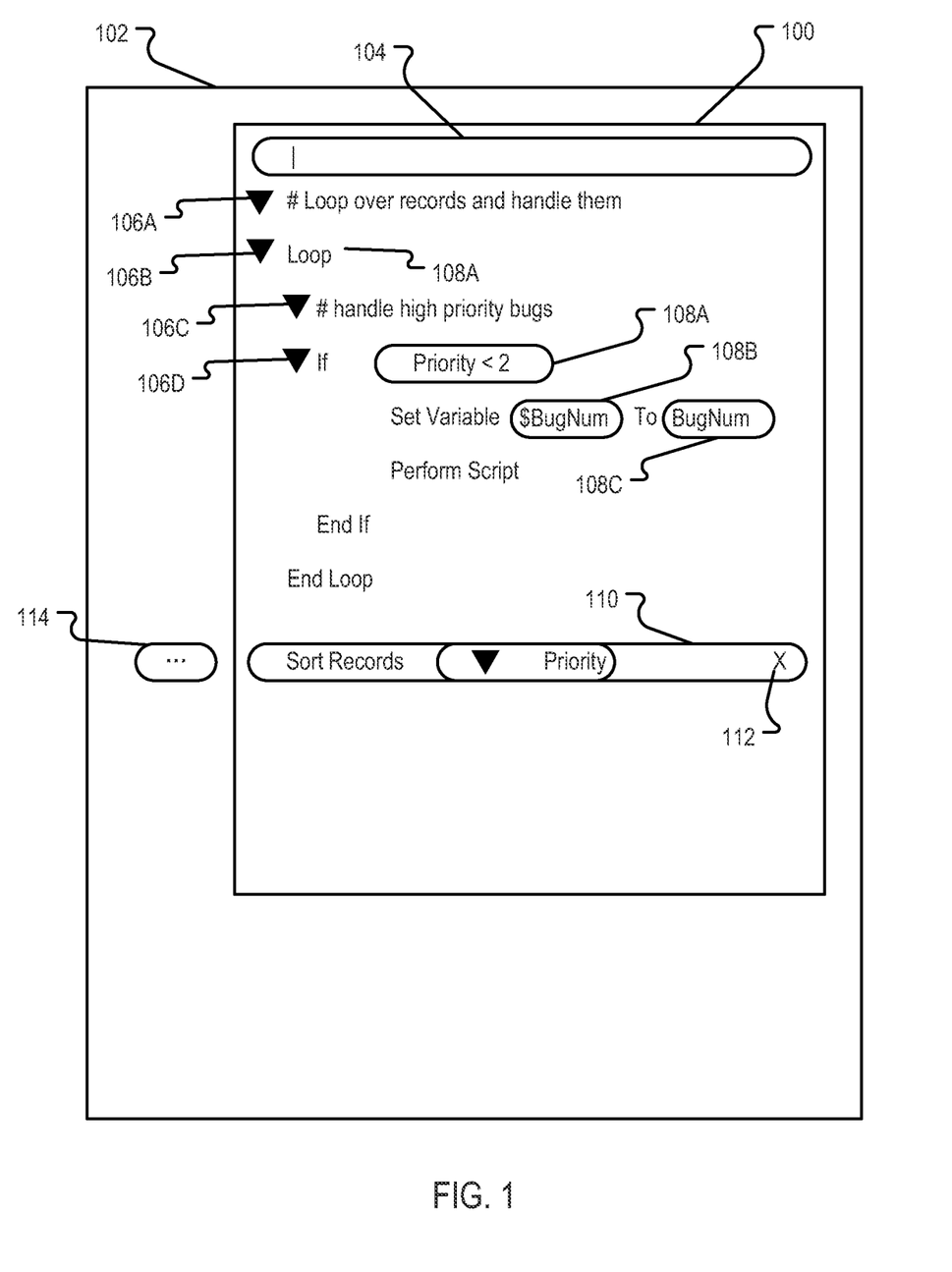
FIG. 1 is a diagram illustrating an exemplary user interface for interactive program editing.

FIG. 1 is a diagram illustrating an exemplary user interface 100 for interactive program editing. User interface 100 can be displayed on a display device 102 of a system that includes a computing device, e.g., a desktop, laptop, or tablet computer. User interface 100 can be an environment for editing text including code of a scripting language or a markup language. User interface 100 can have an appearance of a text editor and provides an editing interface for modifying the code of the scripting language or the markup language.

The system can receive a user input to create a new line in user interface 100. The user input can be hitting a physical or virtual key for creating a new line, e.g., an "Enter" key. The user input can be placing a pointer in an empty area in user interface 100 or a touch input at an empty area in user interface 100. In some implementations, the computing device can detect user typing, and determining that the typing is in an existing non-empty line. In response, the system can designate the typing as the user input to create the new line.

In response to the user input, the system can create new line widget 104 and provide new line widget 104 for display at a location in user interface 100 corresponding to location as indicated by the user input. New line widget 104 can be a data object having an appearance of an empty text line. The data object can include one or more instant variables for storing content, e.g., text or widgets, and one or more methods for receiving and processing the content, for interacting with a user and with other data objects, and for presenting the content in user interface 100. For example, a method of new line widget 104 can display an area that can receive typed or pasted text or other widgets.

The system can determining the location as indicated by the user input based on the location of the user input, e.g., by a location of the pointer input or touch input, or based on a context of the user input. For example, if the input is hitting the "Enter" key, or typing, when a given line of user interface 100 is in focus, the location can be at a line after the given line. Accordingly, a user input of typing an alphanumerical, punctuation, or symbol key can trigger creation of new line widget 104 and an apparent new line in user interface 100.

User interface 100 can include one or more code folding widgets, e.g., code folding widgets 106A, 106B, 106C, and 106D. Additional details of code folding widgets 106A-106D are described below in reference to FIG. 4

User interface 100 can include one or more parameter widgets, e.g., parameter widgets 108A, 108B, and 108C. Each of parameter widgets 108A, 108B, and 108C can correspond to a parameter of a procedure, function, or statement. For example, parameter widget 108A can correspond to a condition in an "If" statement. Parameter widget 108B can correspond to a variable name in a "Set Variable" statement, procedure, or function. Parameter widget 108C can correspond to a database table name, data field name, or function name for assigning to the variable name. Each of parameter widgets 108A, 108B, and 108C can include one or more instance variables and methods for handing content in the respective widget, presenting the content, and interacting with the user or with other widgets. The methods can present each respective widget with an appearance of text. The system can trigger creation and displaying parameter widget 108A upon detecting creation of the "If" statement. The "If" statement may be another widget. Likewise, the system can trigger creation and displaying parameter widgets 108B and 108C upon detecting creation of the "Set Variable" statement, function, or procedure.

User interface 100 can include focus widget 110. Focus widget 110 can include a data object for indicating that a line of code is in focus. For example, focus widget 110 can display a frame around a line of one or more widgets, indicating that the line is in focus. The frame can include user interface item 112 configured to receive a user input to delete the widgets of the line in focus. The system can trigger displaying the frame upon receiving a navigation input that includes, for example, a touch or click input or a keyboard input of an arrow up or arrow down key.

User interface 100 can include dialog widget 114. Dialog widget 114 can be associated with lines that can be edited using a full dialog window. Upon receiving an input through dialog widget 114, the system can display the dialog window for configuring the associated line, including selecting function names, parameter names, table names, and making other changes.

Figure 2:
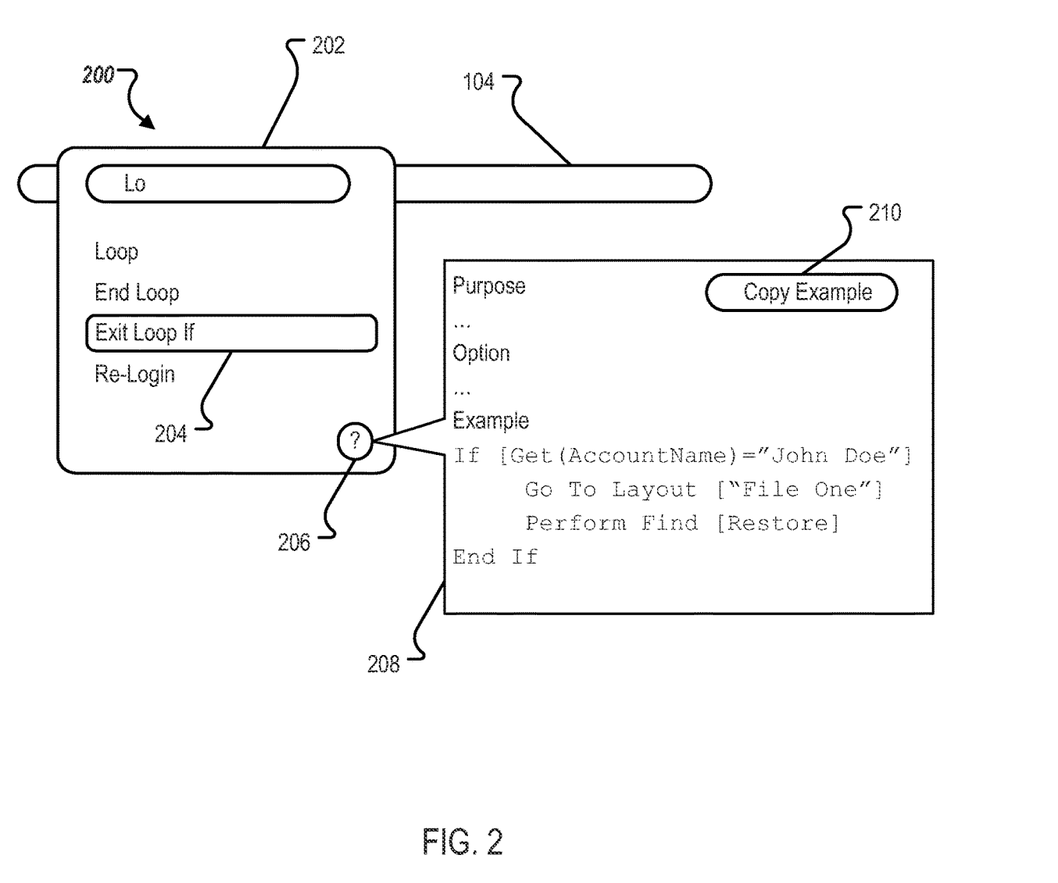
FIG. 2 is a diagram illustrating an exemplary user interface for step and calculation completion.

FIG. 2 is a diagram illustrating an exemplary user interface 200 for step and calculation completion. A script can include one or more instructions that a user defines to automate various tasks. A script step, or simply, step, can include one or more instructions, e.g., a command or a calculation, in a script. A step may include words separated by one or more delimiters that include, for example, space (e.g., "insert file"), camel case capitalization (e.g., "InsertFile"), or underscore (e.g., "Insert_File"). In step completion, a system can provide hints and suggestions on what step a user may intend to type. The system can invoke step completion when a user presses any physical or virtual letter key, e.g., keys "a" through "z." For example, the system can determine that a user typed in new line widget 104 letters "Lo." Upon receiving a user input "Lo" the system can find a step "End Loop" that matches the user input. The system can display the step in step completion widget 202 as a step completion suggestion.

On various occasions, the system can determine that multiple steps qualify for step completion. In response, the system can select, for default, a first step that starts with the input. For example, the system can receiving input "Lo" or "lo." The system can determine, based on matching, that suggestion for completion for "lo" include "End Loop," "Exit Loop If," "Loop," and "Re-Login." The system can determine that "Loop" starts with the input "Lo" or "lo." In response, the system can display each of the matching completions in step completion widget 202, and select "Loop" as default. A default suggestion can be a suggestion that is in focus and that will be entered into a line when the system detects that a user hit "return" key. The system can highlight the default step completion.

The system can receive pointer input through mouse or touchscreen, or key input, e.g., up or down arrow, from a keyboard for navigating multiple step completion suggestions. For example, the system can display the above-described step completion suggestions in step completion widget 202, where "Loop" is highlighted. Upon receiving two keystrokes on down arrows, the system can bring the "Exit Loop If" step in focus by highlighting (204) the "Exit Loop If" step.

Step completion widget 202 can include help widget 206. Help widget 206 is configured to receive a keyboard input or pointer input and in response, provide context-sensitive help information on a step in step completion widget 202 that is in focus. For example, when the step "Exit Loop If" is in focus, help widget 206 can cause help dialog box 208 to be displayed. Help dialog box 208 can display documentation of the step in focus. Help dialog box 208 can include copy example user interface item 210. Copy example user interface item 210 is a component of help dialog box 208 configured to receive a user input and, upon receiving the input, cause the system to complete the step by copying an example to user interface 100 (of FIG. 1). The example may include multiple lines of code. The copying the example can include creating multiple widgets in to user interface 100 corresponding to the multiple lines of code.

Compared to conventional keyword completion, the step completion described in this specification is particularly efficient in handling script steps including common words separated by delimiters (e.g., "Insert File"). The system can perform delimited completion upon detecting that the input contains tokens separated by one or more delimiters, e.g., spaces. In delimited completion, the system matches each token of the input to a beginning of each word in a step name. For example, upon receiving an input containing two tokens and a delimiter (e.g., "i fi"), the system can identify, from step names stored in an indexed step name registry, "Insert File" and "Install Plug-In File" that match the input. The system can then provide suggestions for complete the step name using these two steps.

In some implementations, delimited completion can be order sensitive. For example, the system can receive an input including a first token that appears before a second token. The system may match the input to a step name including a first word that matches the first token and a second word that matches the second token on condition that the first word appears before the second word in the step name. Accordingly, if the system receives an input where tokens are arranged in a first order (e.g., "f c"), the system will find first matching step names (e.g., "Export Field Contents" and "Flush Cache to Disk"). If the system receives an input having the same tokens arranged in a second order (e.g., "c f"), the system will find second matching step names that are different from the first matching step names (e.g., "Check Found Set" and "Close File").

In some implementations, step completion includes acronym completion. In acronym completion, the system can match letters of the input to first letters of words in script step names. For example, the system can receive an input (e.g., "gtrr") that the system determines that matches no step names in delimited completion. The system can then match each letter in the input to a beginning letter of a word in a step name (e.g., step names "Go to Record/Request/Page" and "Go to Related Record"). The system can designate the matching step name as steps completion suggestions.

In some implementations, step completion includes calculation completion. A calculation can be a formula defined by a user or provided in a library. A calculation can include functions, constants, operators, and information from various data fields of a data record stored in a database table. Calculation completion can provide completion for table names, field names, and calculation function names. In response to user input typing one or more letters, the system can provide for display in step completion widget 202 a list of suggestions. The list can combine table names, field names, and calculation function names. The system can display a respective icon next to each entry in the list. The icon can indicate whether the corresponding entry is a table name, field name, or calculation function name. The system can generate the list from multiple sources include static sources and dynamic sources. The static sources can include libraries that declare calculation function names. The dynamic sources can include user-accessible database that includes table names and field names, which may subject to modification.

The system can sort the list, e.g., in alphabetic order. The system can select a function name that matches the user input and that is located highest in the list as a default completion suggestion. If no function name matches the input, the system can select a table name that matches the user input and that is located highest in the list as a default completion suggestion.

Step completion can include parameter completion. The system can determine that a user input is for creating a parameter of a function. For example, the system can determine a user input of "Get(ca" is a input for a function name "Get( )" and a parameter that includes a word that start from "ca." In various step completion implementations, including parameter completion, the system can split a name, e.g., a function name, table name, field name, or parameter name, according to camel casing of that name. In splitting the name, the system can determine multiple words from the name, each starting from a capitalized letter. Accordingly, for example, the system can split a name "CalculationRepetitionNumber" into "Calculation," "Repetition," and "Number." Likewise, the system can split a name "ErrorCaptureState" into "Error," "Capture," and "State." In the "Get(ca" example, the system can determine each of "CalculationRepetitionNumber" and "ErrorCaptureState" includes a word ("Calculation" and "Capture," respectively) that matches "ca." Accordingly, the system can provide both names as suggestions for parameter completion. The system can emphasize, e.g., by highlighting, the words "Calculation" and "Capture" in the suggested names to indicate to a user that these words are the reason the names match the input "ca."

Figure 3:
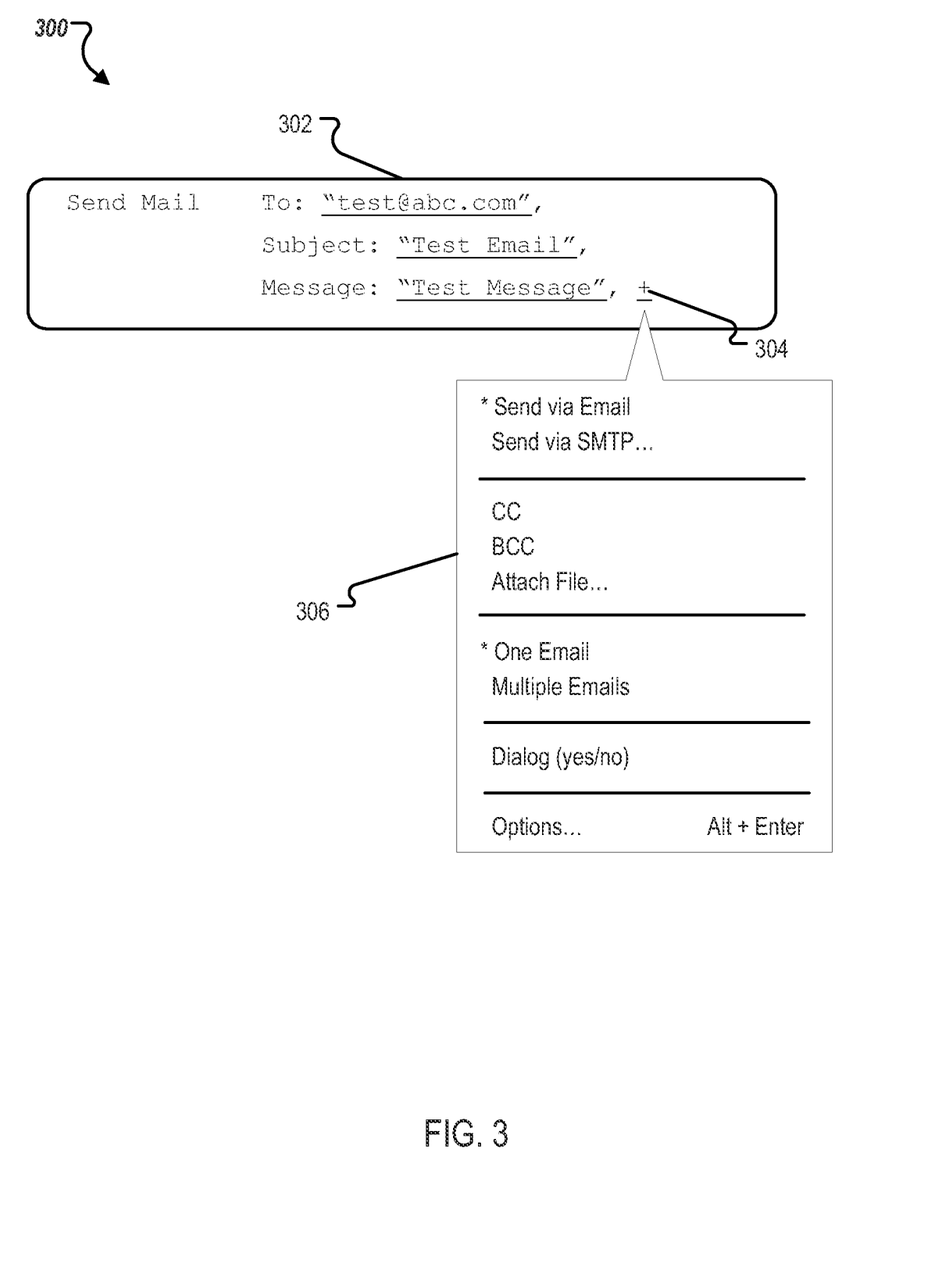
FIG. 3 is a diagram illustrating an exemplary user interface for parameter management.

FIG. 3 is a diagram illustrating an exemplary user interface 300 for parameter management. Interactive code editing can include parameter management. In parameter management, a system can add or remove one or more optional parameters to a script step.

The system can display step widget 302. Step widget 302 can include one or more line widgets for spanning across one or more lines. Each line can correspond to a required parameter to the step. For example, for a "Send Mail" script step that is programmed to send a message, the system can display a "to" parameter widget for specifying a destination, a "subject" parameter widget for specifying a subject line, and a "message" parameter widget for specifying a message body. Each of the "to" parameter widget, "subject" parameter widget, and "message" parameter widget can be part of, or be referenced by, step widget 302.

The "Send Mail" script step may have additional optional parameters, e.g., cc, bcc, and file attachment, among others. The system can provide for display parameter editing widget 304 to represent the optional parameters. Parameter editing widget 304 can include a plus sign ("+") or another symbol. The system can receive a pointer input, tab input, or a type of the symbol (e.g., "+") for accessing parameter editing widget 304. Upon receiving an input to access parameter editing widget 304, the system can display popover widget 306 listing the optional parameters. Upon receiving up or down key input, or receiving type-ahead input, the system can navigate to a given optional parameter displayed in editing widget 304. The optional parameter can include selections between multiple mutually exclusive options, e.g., for sending the message via email client or via simple mail transfer protocol (SMTP) server. The system can display an indicator, e.g., an asterisk or a bullet point, next to a selected option to indicate the current value of the action.

A user can delete a particular optional parameter. The system can receive a navigation input to navigate to a parameter listed in popover widget 306. The system can then put that parameter in focus. Upon receiving a deletion input, e.g., when a user presses a "delete" key, the system can delete the parameter in focus from the optional parameter list.

Figure 4:
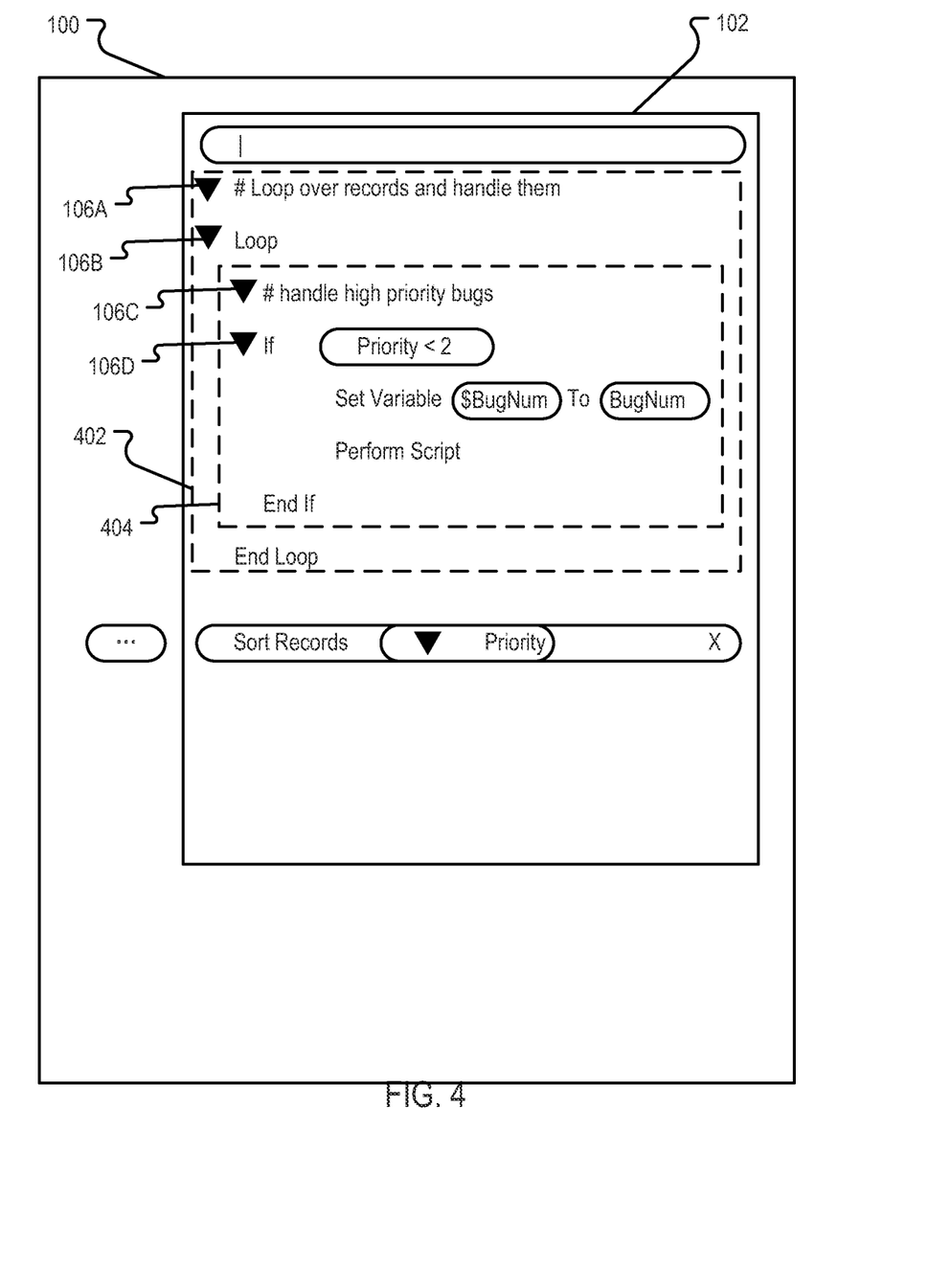
FIG. 4 illustrates exemplary code folding.

FIG. 4 illustrates exemplary code folding. Code folding can include collapsing one or more lines of source code to help a programmer focus on remaining lines of the code. A system can utilize comments in the code for folding the code.

The system can fold source code by code block. A code block, or simply, block, can be one or more lines of comments followed by one or more lines of instructions. Comments can be lines starting with one or more language-specific symbols (e.g., "#" or "//") that cause a compiler or interpreter to ignore rest of the line, or to ignore multiple lines until a closing symbol.

The system can determine a beginning and an end of a block in various ways. For example, the system can determine that a beginning of a block is the beginning of the source code if the source code starts from a line of comments. The system can determine that an end of a block is the end of the source code if the source code ends with instructions. The system can determine that a section of source code beginning with comments, ending with instructions, and being separated from other source code by blank line or indentation level, is a block.

In the example of FIG. 4, the system can recognize that comments "# Loop over records and handle them" is located at beginning of the source code, and that the comments are followed by instructions that end with "End Loop" and then followed by a blank line. In response, the system can determine that the section of code is a first block 402. In addition, the system can recognize that a section of code starting from comments "# handle high priority bugs" and ending with "End If" is located at a deeper indentation level than other sections of code. The system can then determine that this section of code forms block 404. The system can display code folding widgets 106A and 106C for blocks 402 and 404, respectively. The system can display code folding widgets 106A and 106C before the first line of comments in the respective block. Upon receiving an input on code folding widget 106A or 106C, the system can collapse the respective block, including hiding the instructions following the comments from display.

In some implementations, the system can display code folding widget 106B and 106D at beginning of the instructions, and after the comments, in blocks 402 and 404, respectively. Upon receiving an input on code folding widget 106B or 106D, the system can hide the instructions other than the first line of instructions (in this example, "Loop" and "If") from display.

Exemplary Interactive Code Editing Subsystem

Figure 5:
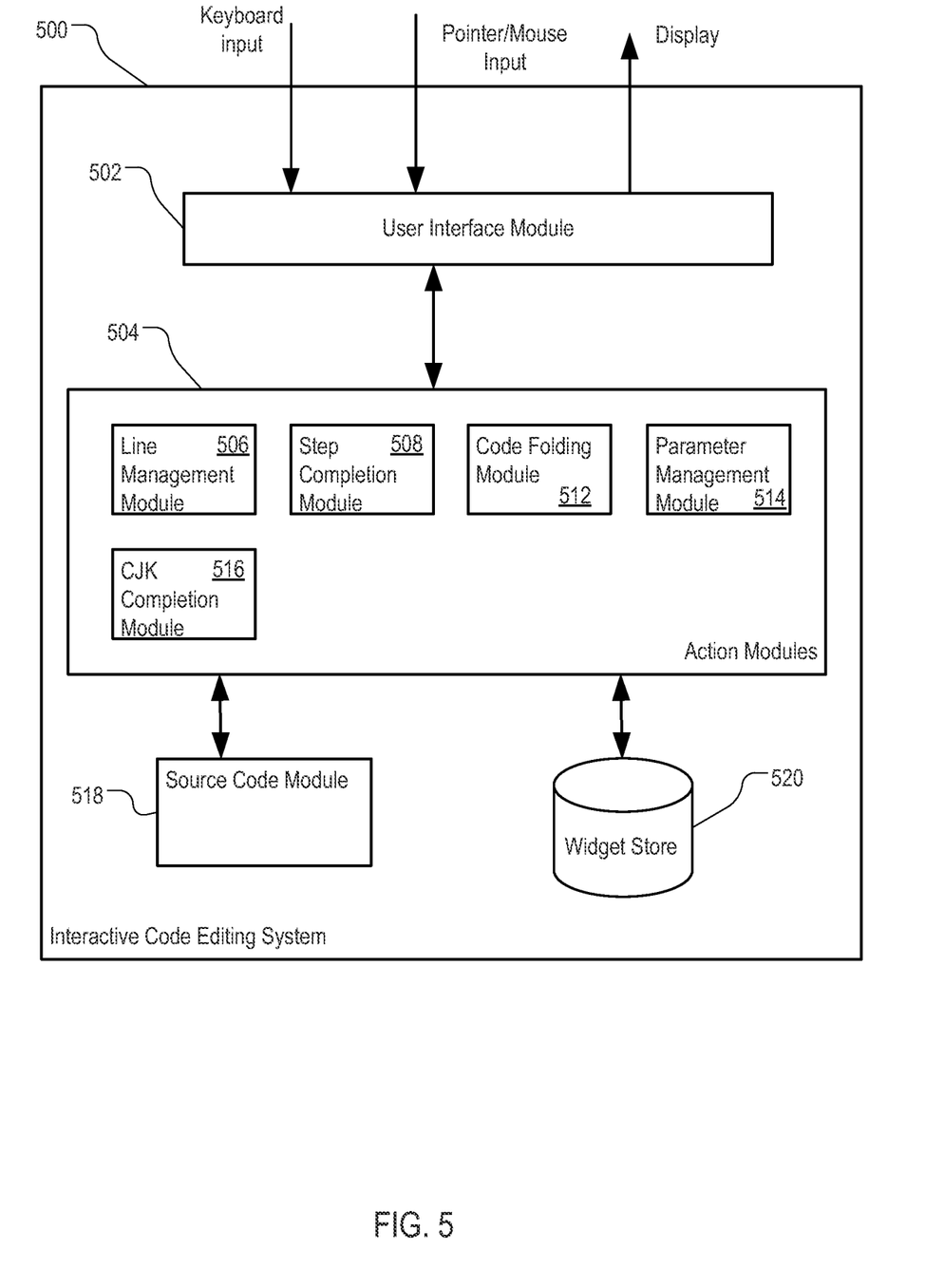
FIG. 5 is a block diagram illustrating components of an exemplary system implementing interactive code editing.

FIG. 5 is a block diagram illustrating components of an exemplary system implementing interactive code editing. Interactive code editing system 500 can be a subsystem of a computing device including one or more computers. Each module of interactive code editing system 500 can include hardware, software, and firmware configured to perform various functions.

Interactive code editing system 500 can include user interface module 502. User interface module 502 is a component of interactive code editing system 500 configured to receive keyboard input, pointer input, and mouse input. User interface module 502 can display various widgets on a display device.

Interactive code editing system 500 can include action modules 504. Action modules 504 can include modules for performing various actions based on user input received by user interface module 502 and generating various widgets to provide to user interface module 502 for display. Action modules 504 can include line management module 506 configured to perform line management operations, e.g., creating new line widgets and deleting lines. Action modules 504 can include step completion module 508 configured to perform step completion operations. Step completion module 508 can include sub-modules for performing calculation completion operations. Action modules 504 can include code folding module 512 configured to perform code folding operations. Action modules 504 can include parameter management module 514 configured to perform parameter management operations. Action modules 504 can include CJK completion module 516 configured to perform operations of completing input for CJK languages.

Interactive code editing system 500 can include source code module 518. Source code module 518 is configured to translate the widgets generated by action modules 504 into text-format source code, or provide text-format source code to action modules 504 for generating widgets.

Interactive code editing system 500 can include widget store 520. Widget store 520 can include a storage device storing various widgets, e.g., new line widgets, step completion widgets, and code folding widgets that can be used by action modules 504.

Exemplary Procedures

Figure 6:
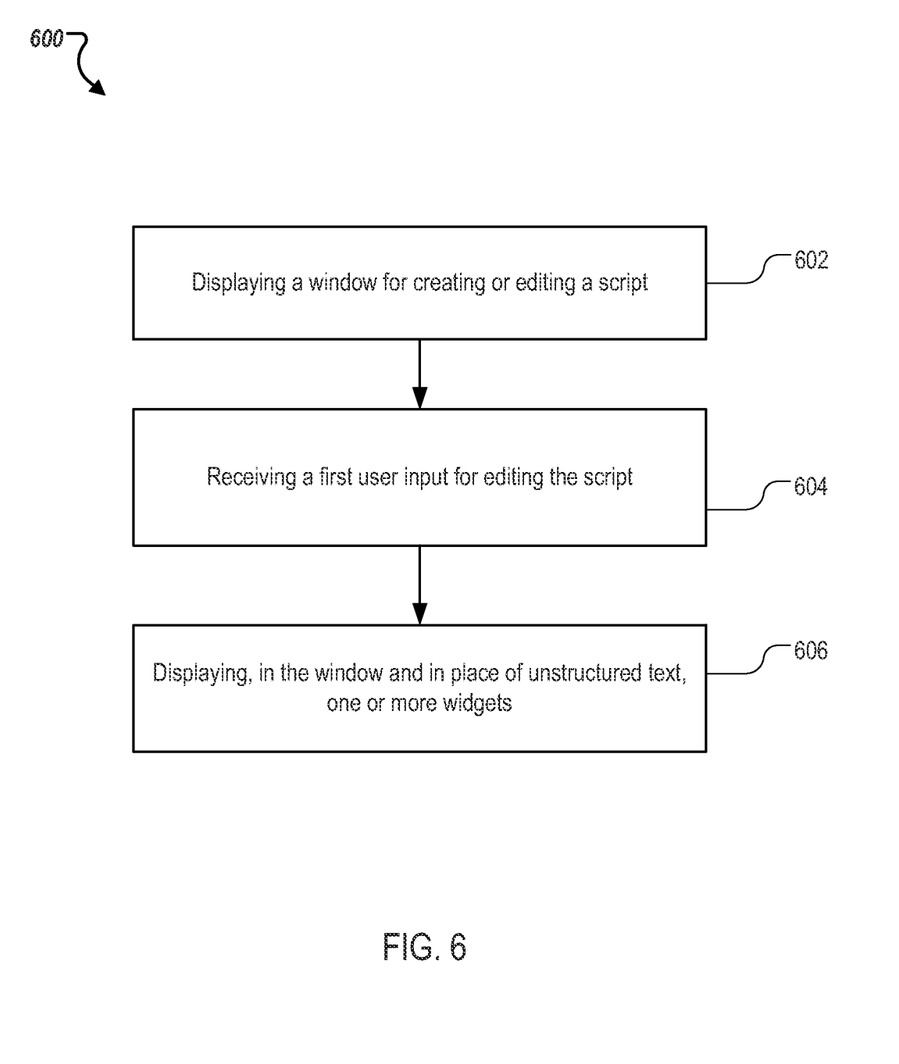
FIG. 6 is a flowchart of an exemplary process of interactive code editing.

FIG. 6 is a flowchart of an exemplary process 600 of interactive code editing. Process 600 can be performed by a system including one or more computer processors, e.g., interactive code editing system 500 of FIG. 5.

The system can display (602) a window for creating or editing a script. The system can receive (604) a first user input for editing the script.

In response to the first user input, the system can display (606), in the window and in place of unstructured text, one or more widgets. Each widget can have an appearance of the unstructured text. Each widget can correspond to a keyword, a control structure, a function name, a function parameter, or a comment of the script. Each widget can be configured to perform actions including receiving a keystroke input and a pointer input for selecting the widget or selecting an item displayed in the widget. The actions can include, upon receiving the keystroke input or pointer input, displaying an editing interface for modifying the script.

The first user input received in stage 604 can include a keystroke for creating a new line. The keystroke can be a keystroke on a new line key or an "Enter" key, or a keystroke for entering a character on a non-empty line displayed in the window. The one or more widgets displayed in stage 606 can include a new line widget. The new line widget can have an appearance of an empty text line or a non-empty text line. The new line widget can receive content, e.g., typed or pasted content, for entering into the script.

The first user input received in stage 604 can be a series of one or more keystrokes inputting one or more alphanumeric characters in a new-line widget. The one or more widgets displayed in stage 606 can include a step completion widget including a list of static items and dynamic items. Each static item can include a function name or keyword. Each dynamic item can include a database table name or data field name of a database table. Each item in the list matches, at least partially matching, the one or more alphanumeric characters.

To determine the match, the system can determine one or more components for each static item and each dynamic item. Each component can include one or more characters separated from other characters of the static item or dynamic item by a pre-specified delimiter that includes at least one of a space, a punctuation mark, or a capitalization. The system can determine that a beginning section of at least one component of a first item includes the one or more alphanumeric characters in the first user input. In response, the system can add the first item to the list for display in the step completion widget.

The one or more alphanumeric characters in the first user input can include a first portion including one or more characters, followed by a space, and then followed by a second portion including one or more characters. Determining that the beginning section of at least one component of the first item includes the one or more alphanumeric characters can include (1) determining that a beginning section of a first component of the first item includes the first portion and (2) determining that beginning section of a second component of the first item includes the second portion, the second component being located after the first component in the first item.

The step completion widget can display a respective indicator in association with each item in the list. The indicator indicating whether a corresponding item is a static item or a dynamic item. The items in the list are displayed in alphanumeric order. A first matching static item can be emphasized and designated as a default entry. If the list contains no static items, a first matching table name can be emphasized and designated as a default entry.

The keystroke input or the pointer input can select one of the static items or one of the dynamic items. To display the editing interface, the system can display the selected static item or dynamic item in the new line widget. The system can also display an interface for editing a parameter of the selected static item or dynamic item in the new line widget.

The first user input received in stage 604 can be an input to write a function that includes one or more optional parameters. The one or more widgets displayed in stage 606 can include a parameter editing widget following a name of the function or, when the function has mandatory parameters, following a last mandatory parameter of the function. The parameter editing widget can be accessed by the keystroke input or the pointer input. Displaying the editing interface can display a selection list of the one or more optional parameters in a popover widget.

Figure 7:
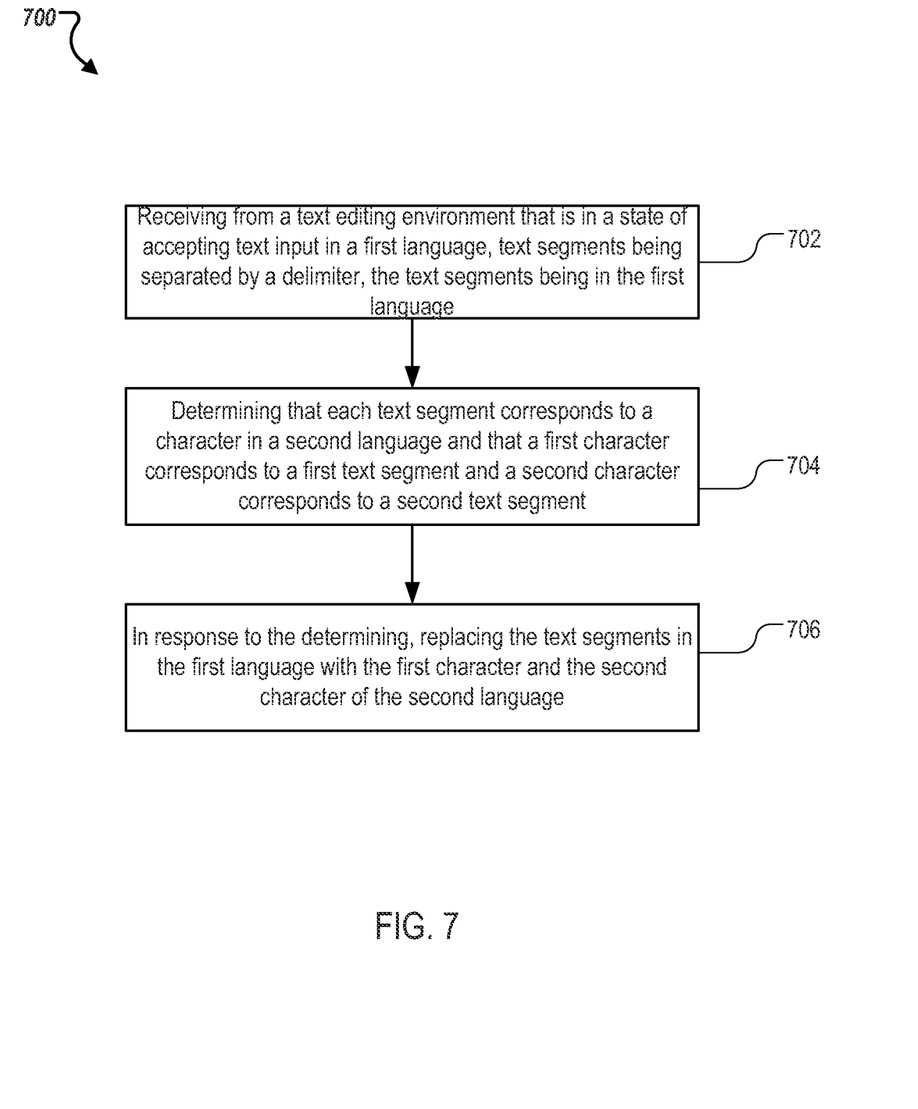
FIG. 7 is a flowchart of an exemplary process of script completion using Chinese, Japanese, or Korean (CJK) languages.

FIG. 7 is a flowchart of an exemplary process of script completion using CJK languages. Process 700 can be performed by a system including one or more computer processors, e.g., interactive code editing system 500 of FIG. 5.

The system can receive (702), from a text editing environment that is in a state of accepting text input in a first language, text segments separated by a delimiter. The text segments can be in the first language. The first language can be English. The delimiter can be a space.

The system can determine (704) that each text segment corresponds to a character in a second language, and that a first character corresponds to a first text segment and a second character corresponds to a second text segment. The second language can be one of Chinese, Korean, or Japanese. The first character and the second character can be indexed in a second language index associated with the text editing environment. The second language index includes an index in kanji, hiragana, katakana, or rōmaji. For example, for a script step, the system can store a Kanji index ("ファイルを挿入"), a hiragana index ("ふぁいる_を_そうにゅう"), and a rōmaji index ("faint wo sounyuu") that can be used to complete a step. For clarity, in the hiragana index above, each underscore "_" represents a space stored with the hiragana characters.

In response to the determining 704, the system can replace (706) the text segments in the first language with the first character and the second character of the second language while the text editing environment remains in the state of accepting text input in the first language. Accordingly, for example, while typing English letters and spaces, a user may see the step name or parameter name change to Kanji, hiragana, or hiragana characters without having to switch language input first. Replacing the text segments with the first character and the second character can occur without requiring a user input for switching the state of accepting text input in the first language to a new state of accepting text input in the second language.

Figure 8:
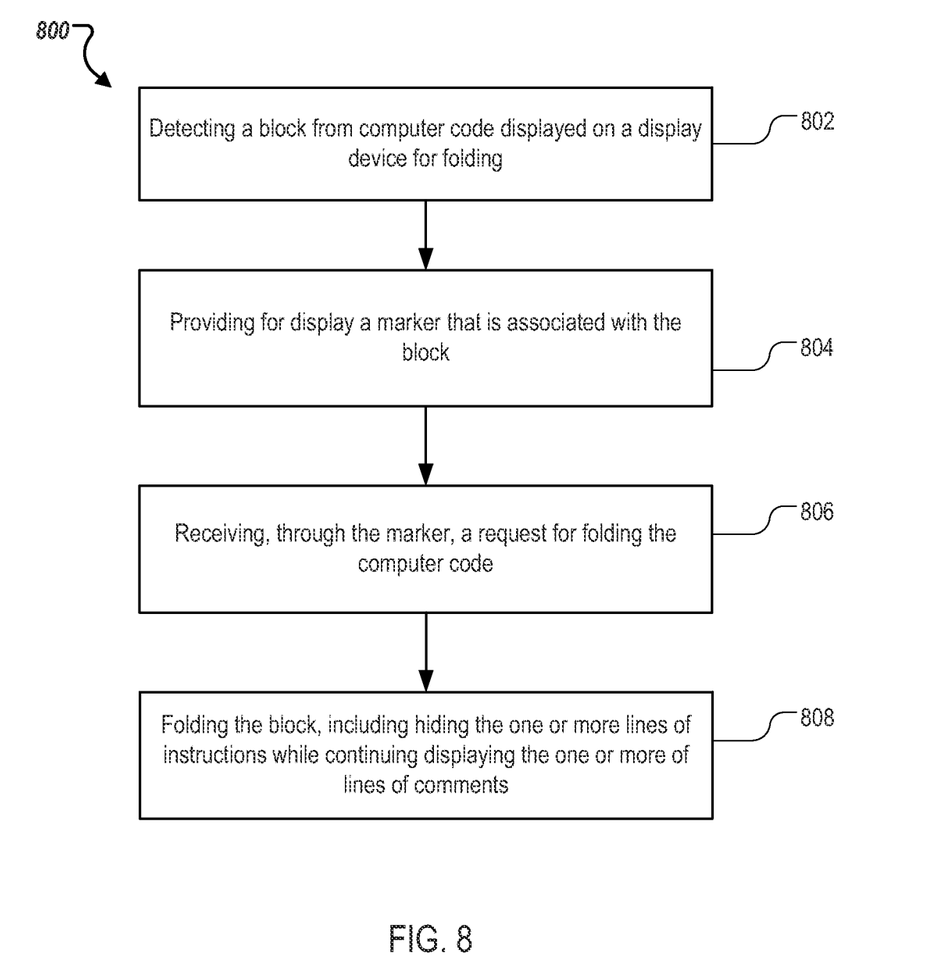
FIG. 8 is a flowchart of an exemplary process of code folding.

FIG. 8 is a flowchart of an exemplary process 800 of code folding. Process 800 can be performed by a system including one or more computer processors, e.g., interactive code editing system 500 of FIG. 5.

The system can detect (802) a block from computer code displayed on a display device for folding. Folding the computer code including collapsing one or more lines of the computer code. Detecting the block can include detecting one or more lines of comments followed by one or more lines of instructions. The system can then designate the one or more lines of comments and the one or more lines of instructions as the block. The system can designate the one or more lines of comments and the one or more lines of instructions as the block upon determining that the one or more lines of comments and the one or more lines of instructions are located at a beginning of the computer code, at an end of the computer code, or are separated from other portions of the computer code by one or more blank lines or by an indentation level.

The system can provide (804) for display a marker that is associated with the block, the marker is configured to receive an input to fold the block. The system can receive (806), through the marker, a request for folding the computer code.

In response to the request, the system can fold (808) the block, including hiding the one or more lines of instructions while continuing displaying the one or more of lines of comments. After folding the block, the system can provide for display a second marker in association with the folded block, the marker operable to receive an input to unfold the block.

In some implementations, detecting the block from the computer code for folding can include detecting one or more lines of error checking instructions and one or more lines of error handling instructions. Folding the block can including hiding the one or more lines of error handling instructions while continuing displaying the error checking instructions.

Exemplary System Architecture

Figure 9:
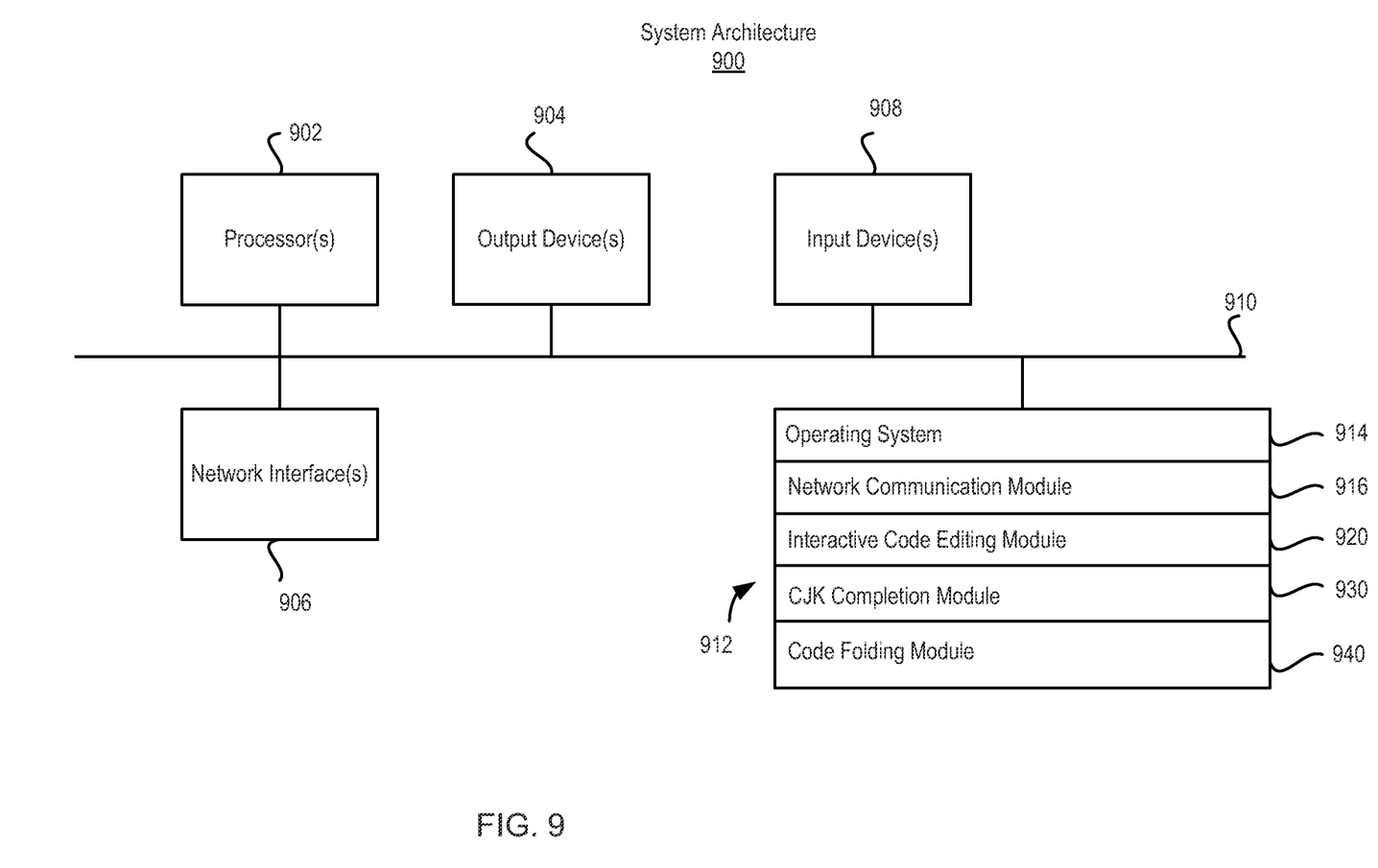
FIG. 9 is a block diagram of an exemplary system architecture for implementing the features and operations of FIGS. 1-8.

FIG. 9 is a block diagram of an exemplary system architecture for implementing the features and operations of FIGS. 1-8. Other architectures are possible, including architectures with more or fewer components. In some implementations, architecture 900 includes one or more processors 902 (e.g., dual-core Intel® Xeon® Processors), one or more output devices 904 (e.g., LCD), one or more network interfaces 906, one or more input devices 908 (e.g., mouse, keyboard, touch-sensitive display) and one or more computer-readable mediums 912 (e.g., RAM, ROM, SDRAM, hard disk, optical disk, flash memory, etc.). These components can exchange communications and data over one or more communication channels 910 (e.g., buses), which can utilize various hardware and software for facilitating the transfer of data and control signals between components.

The term "computer-readable medium" refers to a medium that participates in providing instructions to processor 902 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 912 can further include operating system 914 (e.g., a Linux® operating system), network communication module 916, interactive code editing module 920, CJK completion module 930, and code folding module 940. Operating system 914 can be multi-user, multiprocessing, multitasking, multithreading, real time, etc. Operating system 914 performs basic tasks, including but not limited to: recognizing input from and providing output to devices 906, 908; keeping track and managing files and directories on computer-readable mediums 912 (e.g., memory or a storage device); controlling peripheral devices; and managing traffic on the one or more communication channels 910. Network communications module 916 includes various components for establishing and maintaining network connections (e.g., software for implementing communication protocols, such as TCP/IP, HTTP, etc.).

Interactive code editing module 920 can include computer instructions that, when executed, cause processor 902 to perform operations as described in reference to FIG. 6. CJK completion module 930 can include computer instructions that, when executed, cause processor 902 to perform operations as described in reference to FIG. 7. Code folding module 940 can include computer instructions that, when executed, cause processor 902 to perform operations as described in reference to FIG. 8.

Architecture 900 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more processors, the method comprising:
    displaying, using the one or more processors, a window for an editing interface for modifying a script, the window displayed on a display device, wherein the script includes unstructured text that follows a programming syntax;
    receiving a first input for editing the unstructured text within the script;
    in response to the first input, displaying, in the window and in place of the edited unstructured text, one or more selectable interface elements having an appearance of the edited unstructured text, wherein displaying the one or more selectable interface elements comprises displaying a step completion interface element with at least one step name suggestion, wherein the at least one step name suggestion comprises an indexed user defined name for one or more lines of code;

receiving a second input on the step completion interface element or an item displayed in the step completion interface element to create a focused element of the one or more selectable interface elements;

displaying, in the window, a help widget associated with the focused element;

receiving a third input on the help widget;

in response to the third input, displaying a dialog box adjacent to the window, wherein the dialog box comprises documentation of the focused element, and an example script of the focused element;

receiving a fourth input for selecting the focused element or an item displayed in the focused element; and upon determining that the fourth input is for selecting the focused element or the item displayed in the focused element, displaying, in the window, the editing interface for modifying the script, wherein the editing interface is displayed with the script modified with the one or more lines of code corresponding to the at least one step name suggestion.

2. The method of claim 1, wherein the first input is a keystroke for creating a new line and the method additionally comprises:

displaying the one or more selectable interface elements additionally comprises displaying a new-line interface element, the new-line interface element being a data object having an appearance of an empty text line or a non-empty text line and being operable to receive content for entering into the script; and displaying the editing interface for modifying the script comprises displaying a text input interface for editing the script within the new-line interface element.

3. The method of claim 1, wherein the dialog box further comprises a copy widget to copy example code of the focused element, the method further comprising:

upon determining that the fourth input is for selecting the copy widget, displaying, in the window, the editing interface for modifying the script, wherein the editing interface is displayed with the script modified with the example code corresponding to the focused element.

4. The method of claim 1, wherein:

the first input is a series of one or more keystrokes inputting one or more alphanumeric characters in a new-line interface element, and wherein the at least one step name suggestion at least partially matches the one or more alphanumeric characters.

5. The method of claim 4, wherein the step completion interface includes a list of static items and dynamic items, the static items determined from a first source including one or more libraries that declare one or more functions, the dynamic items determined from a second source including a dynamically modifiable database, further comprising:

determining one or more components for each static item and each dynamic item, each component including one or more characters separated from other characters of the static item or dynamic item by a pre-specified delimiter that includes at least one of a space, a punctuation mark, or a capitalization;

determining that a beginning section of at least one component of a first item includes the one or more alphanumeric characters in the first input; and adding the first item to the list for display in the step completion interface element.

6. The method of claim 5, wherein:

the one or more alphanumeric characters in the first input comprise a first portion including one or more characters, followed by a space, and then followed by a second portion including one or more characters, and determining that the beginning section of at least one component of the first item includes the one or more alphanumeric characters comprises:

determining that a beginning section of a first component of the first item includes the first portion; and determining that beginning section of a second component of the first item includes the second portion, the second component being located after the first component in the first item.

7. The method of claim 5, wherein:

the step completion interface element displays a respective indicator in association with each item in the list, the indicator indicating whether a corresponding item is a static item or a dynamic item, and the items in the list are displayed in alphanumeric order, a first matching static item being emphasized and designated as a default entry.

8. The method of claim 5, wherein:

the second input selects one of the static items or one of the dynamic items, and displaying the editing interface for modifying the script comprises displaying the selected static item or dynamic item in the new-line interface element and displaying, within the editing interface, an interface for editing a parameter of the selected static item or dynamic item in the new-line interface element.

9. The method of claim 1, wherein:

the first input is an input to write a function that includes one or more optional parameters, displaying the one or more interface elements comprises displaying a parameter editing interface element following a name of the function or, when the function has mandatory parameters, following a last mandatory parameter of the function, the parameter editing interface element being accessible by the second input, and displaying the editing interface comprises displaying a selection list of the one or more optional parameters in a popover interface element.

10. The method of claim 1, wherein each selectable interface element corresponds to a keyword, a control structure, a function name, a function parameter, or a comment of the script, and wherein the method further comprises selecting the one or more lines of code based on the edited unstructured text approximating the indexed user defined name.

11. A system comprising:

a display device;

one or more processors; and a storage device storing computer instructions operable to cause the one or more processors to perform operations comprising:

displaying a window for an interface for modifying a script, the script including unstructured text that follows a programming syntax;

receiving a first input for editing the unstructured text within the script;

in response to the first input, displaying, in the window and in place of the edited unstructured text, one or more selectable interface elements having an appearance of the edited unstructured text, wherein displaying the one or more selectable interface elements comprises displaying a step completion interface element for at least one step name suggestion, wherein the at least one step name suggestion comprises an indexed user defined name for one or more lines of code;

receiving a second input on the step completion interface element or an item displayed in the step completion interface element to create a focused element of the one or more selectable interface elements;

displaying, in the window, a help widget associated with the focused element receiving a third input on the help widget;

in response to the third input, displaying a dialog box adjacent to the window, wherein the dialog box comprises documentation of the focused element, and an example script of the focused element;

receiving a fourth input for selecting the focused element or an item displayed in the focused element; and upon determining that the fourth input is for selecting the focused element or the item displayed in the focused element, displaying, in the window, the editing interface for modifying the script, wherein the editing interface is displayed with the script modified with the one or more lines of code corresponding to the at least one step name suggestion.

12. The system of claim 11, wherein the first input is a keystroke for creating a new line and the operations additionally comprise:

displaying the one or more interface elements additionally comprises displaying a new-line interface element, the new-line interface element being a data object having an appearance of an empty text line or a non-empty text line and being operable to receive content for entering into the script; and displaying the editing interface for modifying the script comprises displaying a text input interface for editing the script in the new-line interface element.

13. The system of claim 11, wherein the dialog box further comprises a copy widget to copy example code of the focused element, the operations further comprising:

upon determining that the fourth input is for selecting the copy widget, displaying, in the window, the editing interface for modifying the script, wherein the editing interface is displayed with the script modified with the example code corresponding to the focused element.

14. The system of claim 11, wherein:

the first input is a series of one or more keystrokes inputting one or more alphanumeric characters in a new-line interface element, and wherein the at least one step name suggestion at least partially matches the one or more alphanumeric characters.

15. The system of claim 14, wherein the step completion interface includes a list of static items and dynamic items, the static items determined from a first source including one or more libraries that declare one or more functions, the dynamic items determined from a second source including a dynamically modifiable database, the operations further comprising:

determining one or more components for each static item and each dynamic item, each component including one or more characters separated from other characters of the static item or dynamic item by a pre-specified delimiter that includes at least one of a space, a punctuation mark, or a capitalization;

determining that a beginning section of at least one component of a first item includes the one or more alphanumeric characters in the first input; and adding the first item to the list for display in the step completion interface element.

16. The system of claim 15, wherein:

the one or more alphanumeric characters in the first input comprise a first portion including one or more characters, followed by a space, and then followed by a second portion including one or more characters, and determining that the beginning section of at least one component of the first item includes the one or more alphanumeric characters comprises:

determining that a beginning section of a first component of the first item includes the first portion; and determining that beginning section of a second component of the first item includes the second portion, the second component being located after the first component in the first item.

17. The system of claim 15, wherein:

the step completion interface element displays a respective indicator in association with each item in the list, the indicator indicating whether a corresponding item is a static item or a dynamic item, and the items in the list are displayed in alphanumeric order, a first matching static item being emphasized and designated as a default entry.

18. The system of claim 15, wherein:

the second input selects one of the static items or one of the dynamic items, and displaying the editing interface for modifying the script comprises displaying the selected static item or dynamic item in the new-line interface element and displaying, within the editing interface, an interface for editing a parameter of the selected static item or dynamic item in the new-line interface element.

19. The system of claim 11, wherein:

the first input is an input to write a function that includes one or more optional parameters, displaying the one or more interface elements comprises displaying a parameter editing interface element following a name of the function or, when the function has mandatory parameters, following a last mandatory parameter of the function, the parameter editing interface element being accessible by the second input, and displaying the editing interface comprises displaying a selection list of the one or more optional parameters in a popover interface element.

20. The system of claim 11, wherein each selectable interface element corresponds to a keyword, a control structure, a function name, a function parameter, or a comment of the script, and wherein the operations further comprise selecting the one or more lines of code based on the edited unstructured text approximating the indexed user defined name.

21. A non-transitory machine-readable medium storing instructions which, when performed by one or more processors, cause the one or more processors to perform operations comprising:

displaying, using the one or more processors, a window for an editing interface for modifying a script, the window displayed on a display device, wherein the script includes unstructured text that follows a programming syntax;

receiving a first input for editing unstructured text within the script;

in response to the first input, displaying, in the window and in place of the edited unstructured text, one or more selectable interface elements having an appearance of the edited unstructured text, wherein displaying the one or more selectable interface elements comprises displaying a step completion interface element for at least one step name suggestion, wherein the at least one step name suggestion comprises an indexed user defined name for one or more lines of code;

receiving a second input on the step completion interface element or an item displayed in the step completion interface element to create a focused element of the one or more selectable interface elements;

displaying, in the window, a help widget associated with the focused element;

receiving a third input on the help widget;

in response to the third input, displaying a dialog box adjacent to the window, wherein the dialog box comprises documentation of the focused element, and an example script of the focused element;

receiving a fourth input for selecting the focused element or an item displayed in the focused element; and upon determining that the fourth input is for selecting the focused element or the item displayed in the focused element, displaying, in the window, the editing interface for modifying the script, wherein the editing interface is displayed with the script modified with the one or more lines of code corresponding to the at least one step name suggestion.

22. The non-transitory machine-readable medium as in claim 21, wherein the step completion interface includes a list of static items and dynamic items, the static items determined from a first source including one or more libraries that declare one or more functions, the dynamic items determined from a second source including a dynamically modifiable database, and wherein the step completion interface element displays a respective indicator in association with each item in the list, the indicator indicating whether a corresponding item is a static item or a dynamic item.

23. The non-transitory machine-readable medium as in claim 22, wherein the first input is a series of one or more keystrokes inputting one or more alphanumeric characters in a new-line interface element, and wherein items in the list of static items and dynamic items at least partially match the one or more alphanumeric characters.

24. The non-transitory machine-readable medium as in claim 21, wherein each selectable interface element corresponds to a keyword, a control structure, a function name, a function parameter, or a comment of the script, and wherein the operations further comprise selecting the one or more lines of code based on the edited unstructured text approximating the indexed user defined name.

* * * * *